United States Patent [19]

Kaizerman et al.

[11] 3,972,857

[45] Aug. 3, 1976

[54] SULFUR VULCANIZABLE ETHYLENE-VINYL ACETATE COPOLYMER ELASTOMERS

[75] Inventors: Samuel Kaizerman, Bridgewater Township, Somerset County; Robert Saxon, Princeton, both of N.J.

[73] Assignee: American Cyanamid Company, Stamford, Conn.

[22] Filed: May 8, 1975

[21] Appl. No.: 575,844

[52] U.S. Cl.................. 260/79.5 C; 260/79.5 P; 526/16; 526/30; 526/90; 526/46; 526/331
[51] Int. Cl.$^2$.............. C08F 28/02; C08F 216/14; C08F 218/08
[58] Field of Search........... 260/80.76, 80.81, 87.3, 260/79.5 P, 79.5 C; 450/737, 618, 607.5

[56] References Cited
UNITED STATES PATENTS

| | | | |
|---|---|---|---|
| 2,416,878 | 3/1947 | Lindsey et al. | 260/87.3 |
| 3,752,788 | 8/1973 | Hirooka et al. | 260/80.81 |
| 3,755,237 | 8/1973 | Isaacs et al. | 260/80.81 |

OTHER PUBLICATIONS

Chem. Abstracts, vol. 65, 1966, 20297b.
CA, vol. 68, 1968, 30587t.

*Primary Examiner*—Joseph L. Schofer
*Assistant Examiner*—Maria S. Tungol
*Attorney, Agent, or Firm*—Charles J. Fickey

[57] ABSTRACT

Copolymers of ethylene and vinyl acetate which contain additionally activated halogen atoms as sites for sulfur vulcanization, and the sulfur vulcanized elastomer obtained therefrom.

5 Claims, No Drawings

SULFUR VULCANIZABLE ETHYLENE-VINYL ACETATE COPOLYMER ELASTOMERS

BACKGROUND OF THE INVENTION

This invention relates to sulfur vulcanizable copolymers of ethylene and vinyl acetate. More particularly, it relates to copolymers of ethylene and vinyl acetate which additionally contain activated halogen atoms as sites for sulfur vulcanization, and to the vulcanized elastomers obtained therefrom.

Copolymerization of ethylene and vinyl acetate is well known; see, for example, U.S. Pat. No. 2,703,794 to Roedel. In general, such copolymerization is effected by reaction of ethylene and vinyl acetate in a suitable autoclave under high pressure in the presence of a suitable initiator, such as ferrous sulfate, sodium bisulfite and water. Processes for the continuous copolymerization of ethylene and vinyl acetate are also known; see, for example, U.S. Pat. No. 3,509,115 to French. The copolymers are also readily obtained by copolymerization in the absence of water, e.g. in the presence of benzene, as described by Raetzsch and Musche, Plaste and Kautschuk, 21 (1), 16–18 (1974) and by Roedel, U.S. Pat. No. 2,519,791 and Hanford, U.S. Pat. No. 2,396,785 (Example 16). Furthermore, a comprehensive survey of ethylene-vinyl acetate copolymers is presented in "Ethylene and Its Industrial Derivatives", S.A. Miller, Edit., published by Ernest Benn, London, 1969, particularly pages 437–475, and in "Encyclopedia of Polymer Technology", vol. 6, pages 387–420, published by John Wiley, New York, 1967.

Copolymers of ethylene and vinyl acetate are known to be amorphous, flexible, relatively transparent products, particularly when the proportion of vinyl acetate varies between 20 and 60 weight percent. These copolymers have found substantial commercial use, especially in the manufacture of water- and grease-resistant coatings for paper, modifiers for waxes, and in hot melt adhesives.

Attempts have been made to obtain cured elastomers from ethylene-vinyl acetate copolymers and, while it is possible to cure them, i.e. to provide covalent cross-links between adjacent substantially linear or branched chains, heretofore such cures have required the use of peroxides. One such example is shown by Madge, Chem. & Ind., 1811 (1962).

Peroxide curing is regarded as an undesirable technique by the rubber industry, as opposed to vulcanization, generally regarded as curing in the presence of sulfur or a sulfur donor. Operating hazards are often associated with the use of peroxides; they frequently have an objectionable odor, and more seriously, they are not readily adaptable to the broad formulation techniques developed for typical sulfur-based vulcanization systems. For these and other reasons, ethylene-vinyl acetate copolymers have found only limited use as elastomers despite certain potentially attractive properties, such as good oil resistance, low temperature flexibility, and oxidation resistance. resistance, Accordingly, it is an object of the present invention to provide sulfur vulcanizable copolymers consisting predominantly of ethylene and vinyl acetate repeating units. It is a further object to provide ethylene-vinyl acetate copolymers containing minor amounts of a comonomer having activated halogen atoms as vulcanization sites or ethylene-vinyl acetate copolymers chemically modified to provide such sites. It is yet another object to provide vulcanized elastomers derived from these copolymers by vulcanization with sulfur or sulfur donors.

SUMMARY OF THE INVENTION

In accordance with the present invention we have found that copolymers of ethylene and vinyl acetate are readily vulcanized with sulfur or sulfur donating compounds if there is also present in the copolymer molecule a minor proportion of a chlorine- or bromine-containing functional group pendant from the polymer backbone.

The chlorine- or bromine-containing functional groups may be incorporated into the ethylene-vinyl acetate copolymer either by copolymerization of a vinyl monomer containing the functional group with ethylene and vinyl acetate to provide a random terpolymer, or by chemically modifying a copolymer of ethylene and vinyl acetate by reaction of the acetate functional group of the copolymer with a chlorine- or bromine-containing reagent. For the purposes of the present invention it is not critical which technique is used since the resultant copolymers provide essentially identical vulcanized elastomers. It is also possible within the scope of the present invention to copolymerize minor amounts of another compatible vinyl comonomer not containing chlorine or bromine, or to copolymerize minor amounts of a monomer containing a functional group capable of chemical modification to provide an activated chlorine- or bromine-containing vulcanization site.

The vulcanization site may be represented by an ester or ether side chain R on the polymer molecule, such that R contains a chlorine or bromine atom attached to a carbon atom alpha to the ester carbonyl group or on a carbon atom in a position beta to the ether oxygen atom, e.g.

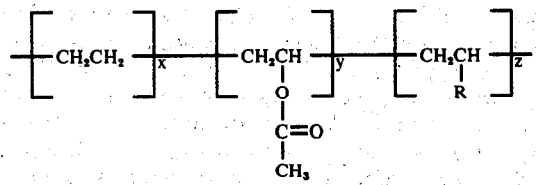

Where R is a group such as:

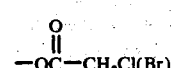

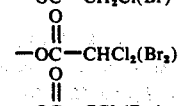

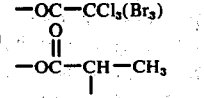

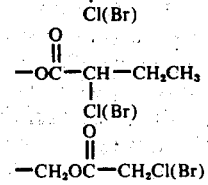

-continued

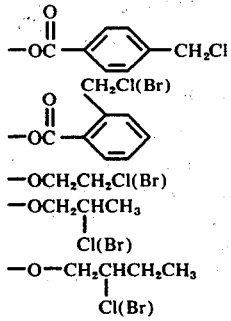

—OCH₂CH₂Cl(Br)
—OCH₂CHCH₃
      |
     Cl(Br)
—O—CH₂CHCH₂CH₃
        |
       Cl(Br)

, and the like

The preferred functional group is the α-chloroacetate group.

When an ethylene-vinyl acetate copolymer is chemically modified by transesterification, optionally in the presence of a transesterification catalyst, either the acetate group is transesterified with a suitable chlorinated or brominated aliphatic or aromatic acid, eliminating acetic acid, or with a lower ester of the aliphatic or aromatic acid in the presence of a suitable catalyst such as tetrabutyl ortho-titanate. Suitable acids include chloroacetic, bromoacetic, dichloroacetic, dibromoacetic, trichloroacetic, tribromoacetic, 2-chloropropionic, 2-bromopropionic, 2-chlorobutyric, 2-bromobutyric, p-chloromethylbenzoic, p-bromomethylbenzoic, o-chloromethylbenzoic, o-bromomethylbenzoic, and the like. Examples of suitable lower esters of the above acids include methyl chloroacetate, ethyl chloroacetate, butyl chloroacetate, ethyl bromoacetate, methyl 2-chloropropionate, ethyl 2-chloropropionate, ethyl dichloroacetate, and the like. Since transesterification proceeds at a convenient rate when a chlorinated or brominated acid is used, there is little or no advantage to be gained by transesterification with the ester.

It is obvious that not all of the vulcanization sites described above can be obtained by a transesterification reaction on the ethylene-vinyl acetate copolymer. In many instances it will be necessary to obtain a desired functional group by copolymerization of a suitably substituted vinyl monomer, e.g. vinyl-2-chloroethyl ether, with appropriate amounts of ethylene and vinyl acetate. Methods of polymerization used to achieve such copolymers are well known and conventional, and the present invention is illustrated herein by means of chemical modification of an ethylene-vinyl acetate copolymer. It should be recognized, however, that similar copolymers are obtained by polymerization techniques and that the vulcanized elastomers have similar properties.

The chlorine or bromine content of the copolymers, whether the polymer is obtained by copolymerization or by chemical modification of an ethylene-vinyl acetate copolymer, is defined in terms of the percentage of vulcanizable chlorine or bromine introduced into the polymer molecule. If the halogen atom is chlorine, as little as 0.2% in the polymer is adequate to permit satisfactory vulcanization with sulfur or a sulfur donor recipe. As much as 2% or more will also be effective; however, we prefer to use copolymers containing from about 0.4–1.5% chlorine. When the halogen atom is bromine, considering the higher atomic weight of bromine, the content may range from about 0.45–4.5%, although we prefer to use a range of about 0.9–3.4%. For reasons of economy and convenience, chlorine is preferred over bromine. Halogen contents in the lower end of the range may provide difficultly vulcanizable elastomers or may require severe vulcanization conditions; high halogen contents offer no advantage and may lead to undesirable side reactions or mold fouling during vulcanization.

The ethylene-vinyl acetate copolymers, as mentioned previously, are well developed in the art. Where it is desired to incorporate halogen-containing vulcanization sites by copolymerization suitable monomers containing such functional groups may be combined with ethylene and vinyl acetate, and no substantial change in the normal polymerization procedure is necessary. It is only necessary to use such a proportion of either a chlorine- or bromine-containing monomer as will be required to achieve in the final copolymer a halogen content within the aforementioned specified range.

When the polymer is chemically modified by transesterification a pre-formed ethylene-vinyl acetate copolymer is melted with the appropriate acid, or lower ester thereof, together with a suitable catalyst, optionally under pressure, and heated with evolution of acetic acid or the appropriate ester. Or, the polymer, acid and catalyst can be combined with a suitable solvent, such as xylene or ethylbenzene and an azeotrope of solvent and acetic acid distilled over as acetic acid is generated. A general procedure for effecting transesterifications of copolymers of vinyl acetate is described by Hicks in U.S. Pat. No. 3,393,183.

The copolymerization of ethylene and vinyl acetate is known to provide copolymers with any desired proportion of the two monomers. For the purposes of the present invention, the weight proportion of ethylene should be no greater than about 80%, but at least 35%. When higher than 80 weight percent ethylene is used there is an objectionable tendency for some of the ethylene in the polymer to be crystalline polyethylene, leading to stiffness and opacity in the copolymers. If less than about 35 weight percent is used, with correspondingly higher vinyl acetate content, the polymer is water sensitive. Moreover, it has been found that the best mechanical properties are provided when the polymer contains from about 35–80 weight percent ethylene, the balance being vinyl acetate and halogen-containing vulcanization site. A preferred range of ethylene is about 40–70 weight percent, with 45–60 weight percent being especially preferred.

The mechanical processing of the polymers of the present invention may be accomplished by conventional means, e.g. by Banbury mixer, two-roll rubber mill, etc. Sulfur, sulfur donors, accelerators, antioxidants, carbon black, other fillers and additives as are commonly employed in the formulation of natural rubber, SBR, acrylic elastomers, and the like may be used. The compounded vulcanizable elastomer may then be fabricated into useful rubber articles by conventional means, e.g. by molding, extrusion, etc.

The invention is more completely illustrated by the following examples.

EXAMPLE 1

R 8442-168

A 500 ml. three-necked, round bottom flask was fitted with an addition tube, a nitrogen inlet, thermometer, mechanical stirrer, distillation head and distilling condenser. The flask was charged with 100 g of xylene and 50 g of Elvax 40 (an ethylene-vinyl acetate copolymer of about 60/40 weight ratio, supplied by E. I. duPont de Nemours & Co.). A gentle stream of nitrogen was introduced, the stirrer was turned on, and the suspension was heated to dissolve the Elvax 40. With the resulting solution at 80°C, 4.7 g of chloroacetic acid and 1.0 g of p-toluenesulfonic acid monohydrate were added. The batch was heated at about 146°–150° with continued stirring and slow nitrogen flow. Distillate was removed at a head temperature not over 127°, until the weight of distillate removed was 28.6 g, containing (by analysis) 2.6 g of acetic acid. The batch was then cooled to 70° and 300 ml of isopropyl alcohol was added with stirring, causing the polymer to precipitate as a solid mass. This was treated with a fresh 300 ml portion of isopropyl alcohol, then cut into small pieces, which were immersed in more isopropyl alcohol to remove any entrapped xylene or unreacted chloroacetic acid. The polymer was then filtered and dried for 3 days in vacuo at room temperature. Its analysis showed 0.70% chlorine. It was a firm, tan-colored gum. The yield was 46.5 g.

EXAMPLE 2

R 7620-177

The polymer produced in Example 1 was compounded as follows:

| Polymer | 100 | parts |
|---|---|---|
| HAF black | 50 | |
| Stearic acid | 1.5 | |
| C-50 powder (a) | 8 | |
| Sulfur | 0.25 | |
| Agerite White (b) | 2.0 | |

(a) 50% active sodium 2-ethylhexanoate
(b) Di-beta-naphthyl-p-phenylenediamine

It was vulcanized for 60 minutes at 350°F in the form of a flat sheet from which specimens were taken for physical test. Test results were:

| Tensile strength | 2450 psi |
|---|---|
| Elongation at break | 360% |
| Modulus - 100% | 704 psi |

-continued

| | |
|---|---|
| - 300% | 2150 psi |

EXAMPLE 3

R 8442-173

The procedure of Example 1 was followed, using Santogum 1050 (a product of the Monsanto Co., comprising approximately equal weights of copolymerized ethylene and vinyl acetate) in place of Elvax 40. The polymer was precipitated in methanol rather than isopropyl alcohol. It was a soft tan-colored gum, which, when vulcanized by the procedure of Example 2, gave a tough rubber.

We claim:

1. A copolymer comprising: (a) from about 35–80 weight percent ethylene, (b) a vinyl monomer represented by the formula

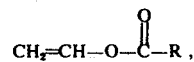

where R is a lower alkyl group containing at least one chlorine or bromine atom on a carbon atom alpha to the carbonyl group, or $CH_2\!\!=\!\!CH\text{-}O\text{-}R'$, where R' is ethyl, propyl or butyl containing at least one chlorine or bromine atom on a carbon atom beta to the ether oxygen; said monomer being present in an amount sufficient to provide between 0.2 and 4.5 weight percent of chlorine and/or bromine in said copolymer, and (c) the remainder of said copolymer being vinyl acetate.

2. Claim 1 wherein R is chloromethyl.

3. The elastomer obtained by the vulcanization with sulfur of claim 1.

4. The product of reaction of a copolymer of ethylene and vinyl acetate with chloroacetic acid; said reaction product being a copolymer containing about 35–80 weight percent combined ethylene, about 0.2–2 weight percent of combined chlorine in the form of vinyl chloroacetate, the remainder of said product copolymer being combined vinyl acetate.

5. The elastomer obtained by the vulcanization with sulfur of claim 4.

* * * * *